United States Patent
Wheeler (10) Patent No.: US 8,307,380 B2
(45) Date of Patent: Nov. 6, 2012

(54) PROXY OBJECT CREATION AND USE

(75) Inventor: Thomas T Wheeler, Plano, TX (US)

(73) Assignee: Curen Software Enterprises, L.L.C., Wilmington, DE (US)

( * ) Notice: Subject to any disclaimer, the term of this patent is extended or adjusted under 35 U.S.C. 154(b) by 83 days.

(21) Appl. No.: 12/787,957

(22) Filed: May 26, 2010

(65) Prior Publication Data

US 2010/0235459 A1    Sep. 16, 2010

Related U.S. Application Data (63) Continuation of application No. 10/975,623, filed on Oct. 28, 2004, now Pat. No. 7,774,789.

(51) Int. Cl.
G06F 9/54 (2006.01)
G06F 13/00 (2006.01)
G06F 15/16 (2006.01)

(52) U.S. Cl. ........ 719/330; 719/313; 709/201; 709/203; 709/217; 709/220

(58) Field of Classification Search .................. None
See application file for complete search history.

(56) References Cited

U.S. PATENT DOCUMENTS

| | | | |
|---|---|---|---|
| 4,714,995 A | 12/1987 | Materna et al. |
| 5,465,111 A | 11/1995 | Fukushima et al. |
| 5,495,533 A | 2/1996 | Linehan et al. |
| 5,524,253 A | 6/1996 | Pham et al. |
| 5,604,800 A | 2/1997 | Johnson et al. |
| 5,675,711 A | 10/1997 | Kephart et al. |
| 5,721,912 A | 2/1998 | Stepczyk et al. |
| 5,778,395 A | 7/1998 | Whiting et al. |
| 5,812,997 A | 9/1998 | Morimoto et al. |
| 5,859,911 A | 1/1999 | Angelo et al. |
| 5,930,798 A | 7/1999 | Lawler et al. |
| 5,982,891 A | 11/1999 | Ginter et al. |
| 6,038,500 A | 3/2000 | Weiss |
| 6,055,562 A | 4/2000 | Devarakonda et al. |
| 6,065,040 A | 5/2000 | Mima et al. |
| 6,088,689 A | 7/2000 | Kohn et al. |
| 6,113,650 A | 9/2000 | Sakai |
| 6,134,580 A | 10/2000 | Tahara et al. |
| 6,134,660 A | 10/2000 | Boneh et al. |
| 6,154,777 A | 11/2000 | Ebrahim |

(Continued)

FOREIGN PATENT DOCUMENTS

JP    2005190103    7/2005

OTHER PUBLICATIONS

"Advisory Action", U.S. Appl. No. 11/086,121, (Sep. 11, 2009), 3 pages.

(Continued)

Primary Examiner — Qing Wu (57) ABSTRACT

Embodiments are discussed for methods, systems, and computer readable media for creating a proxy object, comprising calling a second functionality in a proxy class, creating a proxy object by the second functionality, calling a third functionality by the second functionality, calling a fourth functionality by the third functionality, creating a reference object by the fourth functionality, returning the reference object to the third functionality, associating the reference object to the proxy object by the third functionality, and returning the associated proxy object by the second functionality to a first functionality.

12 Claims, 2 Drawing Sheets

U.S. PATENT DOCUMENTS

| | | |
|---|---|---|
| 6,172,986 B1 | 1/2001 | Watanuki et al. |
| 6,199,195 B1 | 3/2001 | Goodwin et al. |
| 6,202,060 B1 | 3/2001 | Tran |
| 6,209,124 B1 | 3/2001 | Vermeire et al. |
| 6,230,309 B1 | 5/2001 | Turner et al. |
| 6,233,601 B1 | 5/2001 | Walsh |
| 6,253,253 B1 * | 6/2001 | Mason et al. ................ 719/315 |
| 6,256,773 B1 | 7/2001 | Bowman-Amuah |
| 6,272,478 B1 | 8/2001 | Obata et al. |
| 6,282,563 B1 | 8/2001 | Yamamoto et al. |
| 6,282,697 B1 | 8/2001 | Fables et al. |
| 6,304,556 B1 | 10/2001 | Haas |
| 6,330,677 B1 | 12/2001 | Madoukh |
| 6,343,265 B1 | 1/2002 | Glebov et al. |
| 6,349,343 B1 | 2/2002 | Foody et al. |
| 6,389,462 B1 | 5/2002 | Cohen et al. |
| 6,438,744 B2 | 8/2002 | Toutonghi et al. |
| 6,442,537 B1 | 8/2002 | Karch |
| 6,452,910 B1 | 9/2002 | Vij et al. |
| 6,477,372 B1 | 11/2002 | Otting et al. |
| 6,496,871 B1 | 12/2002 | Jagannathan et al. |
| 6,574,675 B1 * | 6/2003 | Swenson ....................... 719/316 |
| 6,600,430 B2 | 7/2003 | Minagawa et al. |
| 6,600,975 B2 | 7/2003 | Moriguchi et al. |
| 6,611,516 B1 | 8/2003 | Pirkola et al. |
| 6,629,032 B2 | 9/2003 | Akiyama |
| 6,629,128 B1 | 9/2003 | Glass |
| 6,662,642 B2 | 12/2003 | Breed et al. |
| 6,671,680 B1 | 12/2003 | Iwamoto et al. |
| 6,687,761 B1 | 2/2004 | Collins et al. |
| 6,701,381 B2 | 3/2004 | Hearne et al. |
| 6,714,844 B1 | 3/2004 | Dauner et al. |
| 6,738,975 B1 | 5/2004 | Yee et al. |
| 6,744,352 B2 | 6/2004 | Lesesky et al. |
| 6,744,358 B1 | 6/2004 | Bollinger |
| 6,744,820 B1 | 6/2004 | Khairallah et al. |
| 6,768,417 B2 | 7/2004 | Kuragaki et al. |
| 6,816,452 B1 | 11/2004 | Maehata |
| 6,831,375 B1 | 12/2004 | Currie et al. |
| 6,851,108 B1 | 2/2005 | Syme |
| 6,862,443 B2 | 3/2005 | Witte |
| 6,876,845 B1 | 4/2005 | Tabata et al. |
| 6,879,570 B1 | 4/2005 | Choi |
| 6,895,391 B1 | 5/2005 | Kausik |
| 6,901,588 B1 | 5/2005 | Krapf et al. |
| 6,904,593 B1 | 6/2005 | Fong et al. |
| 6,931,455 B1 | 8/2005 | Glass |
| 6,931,623 B2 | 8/2005 | Vermeire et al. |
| 6,947,965 B2 | 9/2005 | Glass |
| 6,951,021 B1 | 9/2005 | Bodwell et al. |
| 6,957,439 B1 | 10/2005 | Lewallen |
| 6,963,582 B1 | 11/2005 | Xu |
| 6,981,150 B2 | 12/2005 | Little et al. |
| 6,985,929 B1 | 1/2006 | Wilson et al. |
| 6,993,774 B1 | 1/2006 | Glass |
| 7,010,689 B1 | 3/2006 | Matyas, Jr. et al. |
| 7,043,522 B2 | 5/2006 | Olson et al. |
| 7,047,518 B2 | 5/2006 | Little et al. |
| 7,055,153 B2 | 5/2006 | Beck et al. |
| 7,058,645 B2 | 6/2006 | Seto et al. |
| 7,062,708 B2 | 6/2006 | Mani et al. |
| 7,069,551 B2 | 6/2006 | Fong et al. |
| 7,127,259 B2 | 10/2006 | Ueda et al. |
| 7,127,724 B2 | 10/2006 | Lewallen |
| 7,146,614 B1 | 12/2006 | Nikols et al. |
| 7,146,618 B1 | 12/2006 | Mein et al. |
| 7,172,113 B2 | 2/2007 | Olenick et al. |
| 7,174,533 B2 | 2/2007 | Boucher |
| 7,197,742 B2 | 3/2007 | Arita et al. |
| 7,210,132 B2 | 4/2007 | Rivard et al. |
| 7,213,227 B2 | 5/2007 | Kompalli et al. |
| 7,225,425 B2 | 5/2007 | Kompalli et al. |
| 7,228,141 B2 | 6/2007 | Sethi |
| 7,231,403 B1 | 6/2007 | Howitt et al. |
| 7,237,225 B2 | 6/2007 | Kompalli et al. |
| 7,293,261 B1 | 11/2007 | Anderson et al. |
| 7,376,959 B2 | 5/2008 | Warshavsky et al. |
| 7,475,107 B2 | 1/2009 | Maconi et al. |
| 7,477,897 B2 | 1/2009 | Bye |
| 7,496,637 B2 | 2/2009 | Han et al. |
| 7,499,990 B1 | 3/2009 | Tai et al. |
| 7,502,615 B2 | 3/2009 | Wilhoite et al. |
| 7,506,309 B2 | 3/2009 | Schaefer |
| 7,519,455 B2 | 4/2009 | Weiss et al. |
| 7,566,002 B2 | 7/2009 | Love et al. |
| 7,643,447 B2 | 1/2010 | Watanuki et al. |
| 7,660,777 B1 | 2/2010 | Hauser |
| 7,660,780 B1 | 2/2010 | Patoskie |
| 7,664,721 B1 | 2/2010 | Hauser |
| 7,698,243 B1 | 4/2010 | Hauser |
| 7,702,602 B1 | 4/2010 | Hauser |
| 7,702,603 B1 | 4/2010 | Hauser |
| 7,702,604 B1 | 4/2010 | Hauser |
| 7,774,789 B1 | 8/2010 | Wheeler |
| 7,810,140 B1 | 10/2010 | Lipari et al. |
| 7,823,169 B1 | 10/2010 | Wheeler |
| 7,840,513 B2 | 11/2010 | Hauser |
| 7,844,759 B1 | 11/2010 | Cowin |
| 2001/0029526 A1 | 10/2001 | Yokoyama et al. |
| 2001/0051515 A1 | 12/2001 | Rygaard |
| 2001/0056425 A1 | 12/2001 | Richard |
| 2002/0016912 A1 | 2/2002 | Johnson |
| 2002/0032783 A1 | 3/2002 | Tuatini |
| 2002/0035429 A1 | 3/2002 | Banas |
| 2002/0091680 A1 | 7/2002 | Hatzis et al. |
| 2002/0115445 A1 | 8/2002 | Myllymaki |
| 2002/0116454 A1 | 8/2002 | Dyla et al. |
| 2002/0159479 A1 | 10/2002 | Watanuki et al. |
| 2002/0174222 A1 | 11/2002 | Cox |
| 2002/0196771 A1 | 12/2002 | Vij et al. |
| 2003/0009539 A1 | 1/2003 | Hattori |
| 2003/0018950 A1 | 1/2003 | Sparks et al. |
| 2003/0023573 A1 | 1/2003 | Chan et al. |
| 2003/0033437 A1 | 2/2003 | Fischer et al. |
| 2003/0046377 A1 | 3/2003 | Daum et al. |
| 2003/0046432 A1 | 3/2003 | Coleman et al. |
| 2003/0051172 A1 | 3/2003 | Lordermann et al. |
| 2003/0055898 A1 | 3/2003 | Yeager et al. |
| 2003/0070071 A1 | 4/2003 | Riedel et al. |
| 2003/0101441 A1 | 5/2003 | Harrison, III et al. |
| 2003/0177170 A1 | 9/2003 | Glass |
| 2003/0191797 A1 | 10/2003 | Gurevich et al. |
| 2003/0191969 A1 | 10/2003 | Katsikas |
| 2003/0225789 A1 | 12/2003 | Bussler et al. |
| 2003/0225935 A1 | 12/2003 | Rivard et al. |
| 2004/0003243 A1 | 1/2004 | Fehr et al. |
| 2004/0015539 A1 | 1/2004 | Alegria et al. |
| 2004/0037315 A1 | 2/2004 | Delautre et al. |
| 2004/0044985 A1 | 3/2004 | Kompalli et al. |
| 2004/0044986 A1 | 3/2004 | Kompalli et al. |
| 2004/0044987 A1 | 3/2004 | Kompalli et al. |
| 2004/0064503 A1 | 4/2004 | Karakashian et al. |
| 2004/0078423 A1 | 4/2004 | Satyavolu et al. |
| 2004/0078687 A1 | 4/2004 | Partamian et al. |
| 2004/0082350 A1 | 4/2004 | Chen et al. |
| 2004/0088369 A1 | 5/2004 | Yeager et al. |
| 2004/0111730 A1 | 6/2004 | Apte |
| 2004/0133656 A1 | 7/2004 | Butterworth et al. |
| 2004/0148073 A1 | 7/2004 | Hawig et al. |
| 2004/0153653 A1 | 8/2004 | Abhyankar et al. |
| 2004/0172614 A1 | 9/2004 | Gallagher |
| 2004/0194072 A1 | 9/2004 | Venter |
| 2004/0203731 A1 | 10/2004 | Chen et al. |
| 2004/0220952 A1 | 11/2004 | Cheenath |
| 2004/0221292 A1 | 11/2004 | Chiang et al. |
| 2005/0004727 A1 | 1/2005 | Remboski et al. |
| 2005/0030202 A1 | 2/2005 | Tsuboi |
| 2005/0090279 A9 | 4/2005 | Witkowski et al. |
| 2005/0114832 A1 | 5/2005 | Manu |
| 2005/0141706 A1 | 6/2005 | Regli et al. |
| 2005/0144218 A1 | 6/2005 | Heintz |
| 2005/0163549 A1 | 7/2005 | Shima et al. |
| 2005/0172123 A1 | 8/2005 | Carpentier et al. |
| 2005/0246302 A1 | 11/2005 | Lorenz et al. |
| 2005/0256614 A1 | 11/2005 | Habermas |
| 2005/0256876 A1 | 11/2005 | Eidson |
| 2005/0262155 A1 | 11/2005 | Kress et al. |

| | | |
|---|---|---|
| 2005/0273668 A1 | 12/2005 | Manning |
| 2005/0281363 A1 | 12/2005 | Qi et al. |
| 2006/0005177 A1 | 1/2006 | Atkin et al. |
| 2006/0031850 A1 | 2/2006 | Falter et al. |
| 2006/0040640 A1 | 2/2006 | Thompson et al. |
| 2006/0041337 A1 | 2/2006 | Augsburger et al. |
| 2006/0048145 A1 | 3/2006 | Celli et al. |
| 2006/0080646 A1 | 4/2006 | Aman |
| 2006/0090103 A1 | 4/2006 | Armstrong et al. |
| 2006/0111089 A1 | 5/2006 | Winter et al. |
| 2006/0112183 A1 | 5/2006 | Corson et al. |
| 2006/0121916 A1 | 6/2006 | Aborn et al. |
| 2006/0123396 A1 | 6/2006 | Fox et al. |
| 2006/0143600 A1 | 6/2006 | Cottrell et al. |
| 2006/0149746 A1 | 7/2006 | Bansod et al. |
| 2006/0167981 A1 | 7/2006 | Bansod et al. |
| 2006/0173857 A1 | 8/2006 | Jackson |
| 2006/0190931 A1 | 8/2006 | Scott et al. |
| 2006/0200494 A1 | 9/2006 | Sparks |
| 2006/0206864 A1 | 9/2006 | Shenfield et al. |
| 2006/0220900 A1 | 10/2006 | Ceskutti et al. |
| 2006/0221901 A1 | 10/2006 | Yaqub et al. |
| 2006/0245406 A1 | 11/2006 | Shim |
| 2006/0256007 A1 | 11/2006 | Rosenberg |
| 2006/0256008 A1 | 11/2006 | Rosenberg |
| 2006/0272002 A1 | 11/2006 | Wightman et al. |
| 2007/0004432 A1 | 1/2007 | Hwang et al. |
| 2007/0015495 A1 | 1/2007 | Winter et al. |
| 2007/0026871 A1 | 2/2007 | Wager |
| 2007/0103292 A1 | 5/2007 | Burkley et al. |
| 2007/0112773 A1 | 5/2007 | Joyce |
| 2007/0223432 A1 | 9/2007 | Badarinath |
| 2007/0243880 A1 | 10/2007 | Gits et al. |
| 2008/0077667 A1 | 3/2008 | Hwang et al. |
| 2010/0161543 A1 | 6/2010 | Hauser |
| 2010/0223210 A1 | 9/2010 | Patoskie |

OTHER PUBLICATIONS

"Advisory Action", U.S. Appl. No. 11/086,120, (May 4, 2010), 3 pages.
"Final Office Action", U.S. Appl. No. 10/975,827, (Nov. 23, 2009), 17 pages.
"Final Office Action", U.S. Appl. No. 11/052,680, (Oct. 5, 2009), 16 pages.
"Final Office Action", U.S. Appl. No. 11/086,102, (Oct. 20, 2009), 13 pages.
"Final Office Action", U.S. Appl. No. 11/086,120, (Feb. 23, 2010), 43 pages.
"Final Office Action", U.S. Appl. No. 11/086,211, (Sep. 29, 2009), 18 pages.
"Final Office Action", U.S. Appl. No. 11/495,053, (Mar. 17, 2010), 17 pages.
"Final Office Action", U.S. Appl. No. 10/975,146, (Dec. 1, 2009), 11 pages.
"Final Office Action", U.S. Appl. No. 11/052,680, (May 17, 2010), 12 pages.
"Final Office Action", U.S. Appl. No. 11/052,680, (Feb. 13, 2009), 16 pages.
"Final Office Action", U.S. Appl. No. 11/086,120, (Apr. 14, 2009), 34 pages.
"Final Office Action", U.S. Appl. No. 11/645,301, (May 12, 2010), 32 pages.
"Final Office Action", U.S. Appl. No. 11/645,303, (May 21, 2010), 32 pages.
"Non Final Office Action", U.S. Appl. No. 10/975,827, (Mar. 25, 2010), 19 pages.
"Non Final Office Action", U.S. Appl. No. 11/439,059, (Mar. 26, 2010), 6 pages.
"Non Final Office Action", U.S. Appl. No. 11/645,191, (May 5, 2010), 17 pages.
"Non Final Office Action", U.S. Appl. No. 11/645,192, (May 4, 2010), 14 pages.
"Non Final Office Action", U.S. Appl. No. 11/645,194, (Mar. 26, 2010), 26 pages.
"Non Final Office Action", U.S. Appl. No. 11/645,196, (Apr. 28, 2010), 29 pages.
"Non Final Office Action", U.S. Appl. No. 11/645,198, (Apr. 12, 2010), 14 pages.
"Non-Final Office Action", U.S. Appl. No. 11/052,680, (Feb. 4, 2010), 12 pages.
"Non-Final Office Action", U.S. Appl. No. 11/086,101, (Sep. 2, 2009), 20 pages.
"Non-Final Office Action", U.S. Appl. No. 11/086,102, (Mar. 5, 2010), 15 pages.
"Non-Final Office Action", U.S. Appl. No. 11/086,121, (Dec. 30, 2009), 25 pages.
"Non-Final Office Action", U.S. Appl. No. 11/086,211, (Mar. 4, 2009), 17 pages.
"Non-Final Office Action", U.S. Appl. No. 11/439,059, (Oct. 30, 2009), 9 pages.
"Non-Final Office Action", U.S. Appl. No. 11/495,053, (Jun. 10, 2009), 13 pages.
"Non-Final Office Action", U.S. Appl. No. 11/645,195, (Apr. 15, 2010), 20 pages.
"Non-Final Office Action", U.S. Appl. No. 11/645,197, (Feb. 24, 2010), 13 pages.
"Non-Final Office Action", U.S. Appl. No. 11/645,301, (Jan. 6, 2010), 25 pages.
"Non-Final Office Action", U.S. Appl. No. 11/645,303, (Feb. 8, 2010), 18 pages.
"Non-Final Office Action", U.S. Appl. No. 10/975,146, (May 26, 2009), 10 pages.
"Non-Final Office Action", U.S. Appl. No. 10/975,623, (Nov. 12, 2009), 8 pages.
"Non-Final Office Action", U.S. Appl. No. 10/975,827, (Apr. 7, 2009), 22 pages.
"Non-Final Office Action", U.S. Appl. No. 11/052,680, (May 6, 2009), 15 pages.
"Non-Final Office Action", U.S. Appl. No. 11/086,102, (Jun. 2, 2009), 7 pages.
"Non-Final Office Action", U.S. Appl. No. 11/086,120, (Aug. 13, 2009), 35 pages.
"Non-Final Office Action", U.S. Appl. No. 11/086,121, (Jun. 22, 2009), 26 pages.
"Non-Final Office Action", U.S. Appl. No. 11/645,190, (Mar. 13, 2009), 12 pages.
"Non-Final Office Action", U.S. Appl. No. 11/645,193, (Mar. 16, 2009), 12 pages.
"Non-Final Office Action", U.S. Appl. No. 11/645,291, (Mar. 13, 2009), 12 pages.
"Non-Final Office Action", U.S. Appl. No. 11/645,292, (Apr. 17, 2009), 13 pages.
"Non-Final Office Action", U.S. Appl. No. 11/645,300, (May 11, 2009), 13 pages.
"Non-Final Office Action", U.S. Appl. No. 11/645,302, (May 11, 2009), 13 pages.
"Non-Final Office Action", U.S. Appl. No. 11/645,306, (Jun. 4, 2009), 15 pages.
"Notice of Allowance", U.S. Appl. No. 10/975,623, (Feb. 23, 2010), 9 pages.
"Notice of Allowance", U.S. Appl. No. 11/086,101, (Feb. 25, 2010), 9 pages.
"Notice of Allowance", U.S. Appl. No. 11/645,190, (Sep. 17, 2009), 8 pages.
"Notice of Allowance", U.S. Appl. No. 11/645,193, (Sep. 17, 2009), 8 pages.
"Notice of Allowance", U.S. Appl. No. 11/645,291, (Oct. 1, 2009), 11 pages.
"Notice of Allowance", U.S. Appl. No. 11/645,292, (Nov. 17, 2009), 9 pages.
"Notice of Allowance", U.S. Appl. No. 11/645,300, (Nov. 18, 2009), 9 pages.
"Notice of Allowance", U.S. Appl. No. 11/645,302, (Nov. 17, 2009), 8 pages.
"Notice of Allowance", U.S. Appl. No. 11/645,306, (Nov. 17, 2009), 8 pages.

"Notice of Allowance", U.S. Appl. No. 11/086,101, (Mar. 23, 2009), 7 pages.
"Restriction Requirement", U.S. Appl. No. 11/645,191, (Jan. 28, 2010), 7 pages.
"Restriction Requirement", U.S. Appl. No. 11/645,192, (Jan. 28, 2010), 6 pages.
"Restriction Requirement", U.S. Appl. No. 11/645,198, (Jan. 28, 2010), 6 pages.
"Restriction Requirement", U.S. Appl. No. 11/645,200, (Feb. 26, 2010), 8 pages.
"Restriction Requirement", U.S. Appl. No. 10/975,623, (Jun. 9, 2009), 6 pages.
"Restriction Requirement", U.S. Appl. No. 11/086,102, (Apr. 6, 2009), 7 pages.
"Stuffit Deluxe", Aladdin Systems,(Jan. 1, 2004), 83 pages.
Adnan, Syed et al., "A Survey of Mobile Agent Systems", CSE 221, Final Project, Jun. 13, 2000.,(Jun. 13, 2000), 12 pages.
Ballance, Robert A., et al., "The Pan Language-Based Editing System for Integrated Development Environments", *ACM*, (Oct. 1990), pp. 77-93.
Baumann, J. et al., "Mole 3.0: A Middleware for Java-Based Mobile Software Agents", (1998), 18 pages.
Bigus, J.P. et al., "ABLE: A toolkit for building multiagent autonomic systems", IBM Systems Journal, vol. 41, No. 3, 2002.,(2002), 22 pages.
Blackwell, John "Remit—Rule-Based Alert Management Information Tool", *Thesis, Florida State University College of Arts and Sciences*, (2004), pp. 1-69.
Brandt, Raimund "Dynamic Adaptation of Mobile Code in Heterogenous Environments", Der Teschnischen Universitat Munchen,(Feb. 15, 2001), 76 pages.
Brazier, F.M.T. et al., "Generative Migration of Agents", Department of Computer Science, Faculty of Sciences, Vrije Universiteit Amsterdam; de Boelelaan 1081a, 1081 HV Amsterdam, The Netherlands {frances, bjo, steen, niek} @cs.vu.l,(Aug. 2002), 4 pages.
Bursell, Michael et al., "Comparison of autonomous mobile agent technologies", (May 12, 1997), 28 pages.
Bussler, Christoph "The Role of B2B Engines in B2B Integration Architectures", *ACM SIGMOD Record*, vol. 31, No. 1, (Mar. 2002), pp. 67-72.
Christopoulou, Eleni et al., "An ontology-based context management and reasoning process for UbiComp applications", Research Academic Computer Technology Institute, Research Unit 3, Design of Ambient Information Systems Group, N. Kazantzaki str., Rio Campus, 26500, Patras, Greece {hristope, goumop, kameas} @cti.gr,(Oct. 2005), 6 pages.
Dilts, David M., et al., "An Intelligent Interface to CIM Multiple Data Bases", *Proceedings of the 1990 ACM SIGBDP Conference on Trends and Directions in Expert Systems*, vol. 3, Issue 1,, (Mar. 2004), pp. 491-509.
Emmerich, Wolfgang et al., "TIGRA—An Architectural Style for Enterprise Application Integration", *IEEE* (Jul. 2001), p. 567-576.
Flanagan, Roxy "Graphic + Internet Related Tutorials Using Winzip", Retrieved from: <http://www.autumnweb.com/Roxys/2Tutorials/4WinzipTutorial.html>_on Feb. 10, 2009, indexed by www.archive.org,(Oct. 30, 2008), 8 pages.
Forte, "Feature Comparison of Agent and Free Agent", Retrieved from: <www.forteinc.com/agent/features.php>_on Jan. 26, 2010, (2002), 3 pages.
Gu, Tao et al., "Toward an OSGi-Based Infrastructure for Context-Aware Applications", *Pervasive Computing IEEE*, vol. 3, Issue 4. Digital Object Identifier 1031109/MPRV.2004.19, (Oct.-Dec. 2004), 9 pages.
Hasegawa, Tetsou et al., "Inoperability for mobile agents by incarnation agents", AAMAS; Melbourne, Australia; ACM, 1-58113-683, pp. 1006-1007,(Jul. 14, 2003), 2 pages.
Jandl, M. et al., "Enterprise Application Integration by means of a generic CORBA LDAP Gateway", *Proceedings of the 24th International Conference on Software Engineering*, (Mar. 2002), p. 711.
Jih, Wan-Rong et al., "Context-aware Access Control in Pervasive Healthcare", Computer Science and Information Engineering, National Taiwan University, Taiwan. jih@agents.csie.ntu.edu.tw, {r93070, yjhsu} @csie.ntu.edu.tw,(2005), 8 pages.

Lockemann, Peter C., "Agents and Databases: Friends or Foes?", *Proceedings of the 9th International Database Engineering& Application Symposium (IDEAS '05)*, (2005), 11 pages.
Pantic, M. et al., "Simple Agent Framework: An Educational Tool Introducing the Basics of Al Programming", *Information Technology: Research and Education, 2003 Proceedings. ITRE2003.*, (Aug. 2003), pp. 426-430.
Pauline, Siu Po Lam "Context-Aware State Management for Supporting Mobility in a Pervasive Environment", A thesis submitted to The University of Hong Kong in fulfillment of the thesis requirement for the degree of Master of Philosophy.,(Aug. 2004), 106 pages.
Qui-Sheng, He et al., "A Lightweight Architecture to Support Context-Aware Ubiquitous Agent System", Department of Computer Science and Engineering, Fudan University, Shanghai 200433, Chain {hequisheng, sltu} @fudan.edu.cn,(Aug. 2006), 6 pages.
Russell, Stuart et al., "Artificial Intelligence: A Modern Approach", *Pearson*, (2003), pp. 5, 32-56, 449-454.
Singh, Vishal K., et al., "DYSWIS: An Architecture for Automated Diagnosis of Networks", *Operations and Management Symposium*, 2008, (Apr. 2008), pp. 851-854.
Stallings, William "ISDN and Broadband ISDN with Frame Relay and ATM", *Prentice-Hall*, (1999), 5 pages.
Sterritt, Roy et al., "From Here to Autonomicity: Self-Managing Agents and the Biological Metaphors that Inspire Them", Integrated Design and Process Technology, pp. 143-150.,(Jun. 2005), 8 pages.
Sutherland, et al., "Enterprise Application Integration and Complex Adaptive Systems", *ACM*, (Oct. 2002), pp. 59-64.
Van Praet, J. et al., "Processor Modeling and Code Selection for Retargetable Compilation", *ACM, TODAES* vol. 6, Issue 3, (Jul. 2001), pp. 277-307.
Yu, Ping et al., "Mobile Agent Enabled Application Mobility for Pervasive Computing", Internet and Mobile Computing Lab, Department of Computing, Hong Kong Polytechnic University, Hung Hom, Kowloon, Hong Kong {cspyu, csjcao, cswen} @comp.polyu.edu.hk.,(Aug. 2006), 10 pages.
"Advisory Action", U.S. Appl. No. 11/495,053, (May 26, 2010), 3 pages.
"Final Office Action", U.S. Appl. No. 11/086,102, (Jul. 1, 2010), 14 pages.
"Final Office Action", U.S. Appl. No. 11/086,121, (Jun. 16, 2010), 30 pages.
"Final Office Action", U.S. Appl. No. 11/645,197, (Jul. 19, 2010), 16 pages.
"Non Final Office Action", U.S. Appl. No. 11/645,200, (May 26, 2010), 34 pages.
"Notice of Allowability", U.S. Appl. 10/975,146, (Jul. 13, 2010), 2 pages.
"Notice of Allowance", U.S. Appl. No. 11/439,059, (Jul. 14, 2010), 12 pages.
Bagci, et al., "Communication and Security Extensions for a Ubiquitous Mobile Agent System (UbiMAS)", *In Proceedings of CF 2005*, Available at <http://portal.acm.org/ft_gateway.cfm?id=1062302&type=pdf&coll=GUIDE&dl=GUIDE&CFID=91857573&CFTOKEN=53726080>,(May 2005), pp. 246-251.
Karnik, Neeran M., et al., "Security in the Ajanta Mobile Agent System", Softw. Pract. Exper. 31, 4 (Apr. 2001), 301-329,(2001), 28 pages.
Korba, Larry "Towards Secure Agent Distribution and Communication", In Proceedings of the 32nd Annual Hawaii International Conference on System Science—vol. 8 (Jan. 5-8, 1999). HICSS. IEEE Computer Society, Washington, DC, 8059.,(1999), 10 pages.
Poggi, Agostino et al., "Security and Trust in Agent-Oriented Middleware", OTM Workshops 2003: 989-1003,(2003), 15 pages.
Rosenberg, Jonathan et al., "Programming Internet Telephony Services", *IEEE Network*, (May/Jun. 1999), 8 pages.
Walsh, Tom et al., "Security and Reliability in Concordia", In Mobility: Processes, Computers, and Agents ACM Press/Addison-Wesley Publishing Co., New York, NY, 524-534.,(1999), 10 pages.
"Advisory Action", U.S. Appl. No. 11/052,680, (Jul. 28, 2010), 3 pages.
"Advisory Action", U.S. Appl. No. 11/645,197, (Oct. 6, 2010), 3 pages.

"Advisory Action", U.S. Appl. No. 11/645,303, (Jul. 28, 2010), 3 pages.
"Final Office Action", Application Oct. 21, 2010, 34 pages.
"Final Office Action", U.S. Appl. No. 10/975,827, (Sep. 15, 2010), 22 pages.
"Final Office Action", U.S. Appl. No. 11/645,192, (Sep. 15, 2010), 14 pages.
"Final Office Action", U.S. Appl. No. 11/645,194, (Sep. 15, 2010), 28 pages.
"Final Office Action", U.S. Appl. No. 11/645,196, (Sep. 22, 2010), 33 pages.
"Final Office Action", U.S. Appl. No. 11/645,198, (Sep. 16, 2010), 22 pages.
"Non Final Office Action", U.S. Appl. No. 11/645,301, (Jul. 30, 2010), 18 pages.
"Non Final Office Action", U.S. Appl. No. 11/645,303, (Aug. 19, 2010), 20 pages.
"Non-Final Office Action", U.S. Appl. No. 12/647,964, (Sep. 8, 2010), 5 pages.
"Notice of Allowance", U.S. Appl. No. 11/086,121, (Oct. 7, 2010), 6 pages.
"Notice of Allowance", U.S. Appl. No. 11/645,195, (Oct. 7, 2010), 8 pages.
"Notice of Allowance", U.S. Appl. No. 12/714,753, (Sep. 27, 2010), 7 pages.
"Notice of Allowance", U.S. Appl. No. 11/495,053, (Aug. 31, 2010), 7 pages.
"The Sims", *Sims, Electronic Arts*, (2000), 57 pages.
"WOW, World of Warcraft", *Wikipedia (online)*, *Retreived from Internet in 2010*, <URL:http://en.wikipedia.org/wiki/World_of_Warcraft>, (2010), 28 pages.
Barba, Rick "The Sims Prima's Official Strategy Guide", *Prima Publishing; ISBN*: 7615-2339-1, (2000), 98 Pages.
Chang, Yao-Chung et al., "All-IP Convergent Communications over Open Service Architecture", *2005 Wireless Telecommunications Symposium, IEEE*, 0-7803-8856, (2005), pp. 202-210.
Erfurth, Christian et al., "Migration Intelligence for Mobile Agents", U.S. Appl. No. 11/645,192, Sep. 15, 2010, (2001), 8 pages.
Hinchey, Michael G., et al., "Formal Approaches to Agent-Based Systems", *2nd International Workshop FAABS*, (Oct. 2002), 291 pages.
Taylor, T.L. "Does WoW Change Everything?", *Games and Culture*, vol. 1, No. 4, (Oct. 2006), 20 pages.
"Final Office Action", U.S. Appl. No. 11/645,191, (Oct. 28, 2010), 19 pages.
"Non Final Office Action", U.S. Appl. No. 11/052,680, (Nov. 19, 2010), 17 pages.
"Non Final Office Action", U.S. Appl. No. 11/645,197, (Nov. 29, 2010), 20 pages.
"Notice of Allowance", U.S. Appl. No. 12/647,964, (Nov. 30, 2010), 7 pages.

* cited by examiner

PROXY OBJECT CREATION AND USE

RELATED APPLICATIONS

This application is a continuation of, claims priority to, and incorporates by reference in its entirety, U.S. patent application Ser. No. 10/975,623, filed Oct. 28,2004 (now U.S. Pat. No. 7,774,789) and entitled "Creating a Proxy Object and Providing Information Related to a Proxy Object."

BACKGROUND

A problem exists in the current art of effectively and efficiently acquiring an initial remote reference to a remote object.

SUMMARY

In some embodiments, a method for creating a proxy object, comprises a second functionality in a proxy class, creating a proxy object by the second functionality, calling a third functionality by the second functionality, calling a fourth functionality by the third functionality, creating a reference object by the fourth functionality, returning the reference object to the third functionality, associating the reference object to the proxy object by the third functionality, and returning the associated proxy object by the second functionality to a first functionality.

In some embodiments, a method for providing information related to a proxy object to a first functionality comprises receiving a lookup URL by a second functionality, calling a third functionality based on the lookup URL, and returning the information based on the called third functionality.

In some embodiments, a computer readable medium comprises instructions for calling a functionality in a proxy class, creating a proxy object by the functionality, creating a reference object by another functionality, and associating the reference object to the proxy object by a further functionality.

In some embodiments, a computer readable medium comprises instructions for receiving a lookup URL, calling a functionality based on the lookup URL, and returning information related to a proxy object based on the called third functionality.

In some embodiments, a system for creating a proxy object, comprises a client adapted to call a second functionality in a proxy class, create a proxy object by the second functionality, create a reference object by a fourth functionality, return the reference object to a third functionality, associate the reference object to the proxy object by the third functionality, and return the associated proxy object by the second functionality to a first functionality.

In some embodiments, a system for providing information related to a proxy object, comprises a server adapted to receive a lookup URL, and call a functionality based on the lookup URL, and a client adapted to receive information from the server based on the called third functionality.

DETAILED DESCRIPTION

Some embodiments are related to proxy object, and, more specifically to creating a proxy object and providing information related to a proxy object.

According to some embodiments, an architect console is utilized through which at least one proxy and adapter are provided to a selected source. The architect console analyzes source code, methods within classes that will be exposed and selected, and mapping and various generation options for those methods are provided. The analyzing allows a database of classes, method and fields to be built. Based on a received command, all of the proxies, adapters and streamers that will be needed to perform invocations (or example, remote invocations) are generated in an appropriate source language. For example, if a server associated with JAVA code whose functionality is to be exposed to a C++ client, then JAVA adapters are generated for the server, and C++ source code proxies are generated for the client.

Within the proxy of one or more embodiments, initialization code, at least one proxy method, and at least one lookup method exist. The initialization code registers a type of that proxy within the run time, and registers method streamers used to marshal and unmarshal arguments, and return values passed during remote invocations. The proxy methods have the same signature as the business method of the object that is being exposed. As such, the client "believes" that it is accessing the business object directly but is really invoking the business object through the proxy. The lookup method is called by the client in order to acquire a proxy that is found in a naming service.

Within the adapter of one or more embodiments, initialization code, at least one proxy method, and at least one lookup, at least one bind method, and an invoke method, exist. The bind method can be called to register an adapter in the naming service, while the invoke method, which will be called by the run time, will dispatch the invocation to the appropriate business method. Some embodiments create a proxy object and provide information related to a proxy object.

Some embodiments are related to proxy object, and, more specifically to creating a proxy object and providing information related to a proxy object.

According to some embodiments, an architect console is utilized through which at least one proxy and adapter are provided to a selected source. The architect console analyzes source code, methods within classes that will be exposed and selected, and mapping and various generation options for those methods are provided. The analyzing allows a database of classes, method and fields to be built. Based on a received command, all of the proxies, adapters and streamers that will be needed to perform invocations (or example, remote invocations) are generated in an appropriate source language. For example, if a server associated with JAVA code whose functionality is to be exposed to a C++ client, then JAVA adapters are generated for the server, and C++ source code proxies are generated for the client.

Within the proxy of one or more embodiments, initialization code, at least one proxy method, and at least one lookup method exist. The initialization code registers a type of that proxy within the run time, and registers method streamers used to marshal and unmarshal arguments, and return values passed during remote invocations. The proxy methods have the same signature as the business method of the object that is being exposed. As such, the client "believes" that it is accessing the business object directly but is really invoking the business object through the proxy. The lookup method is called by the client in order to acquire a proxy that is found in a naming service.

Within the adapter of one or more embodiments, initialization code, at least one proxy method, and at least one lookup, at least one bind method, and an invoke method, exist. The bind method can be called to register an adapter in the naming service, while the invoke method, which will be called by the run time, will dispatch the invocation to the appropriate business method. Some embodiments create a proxy object and provide information related to a proxy object.

Figure 1:
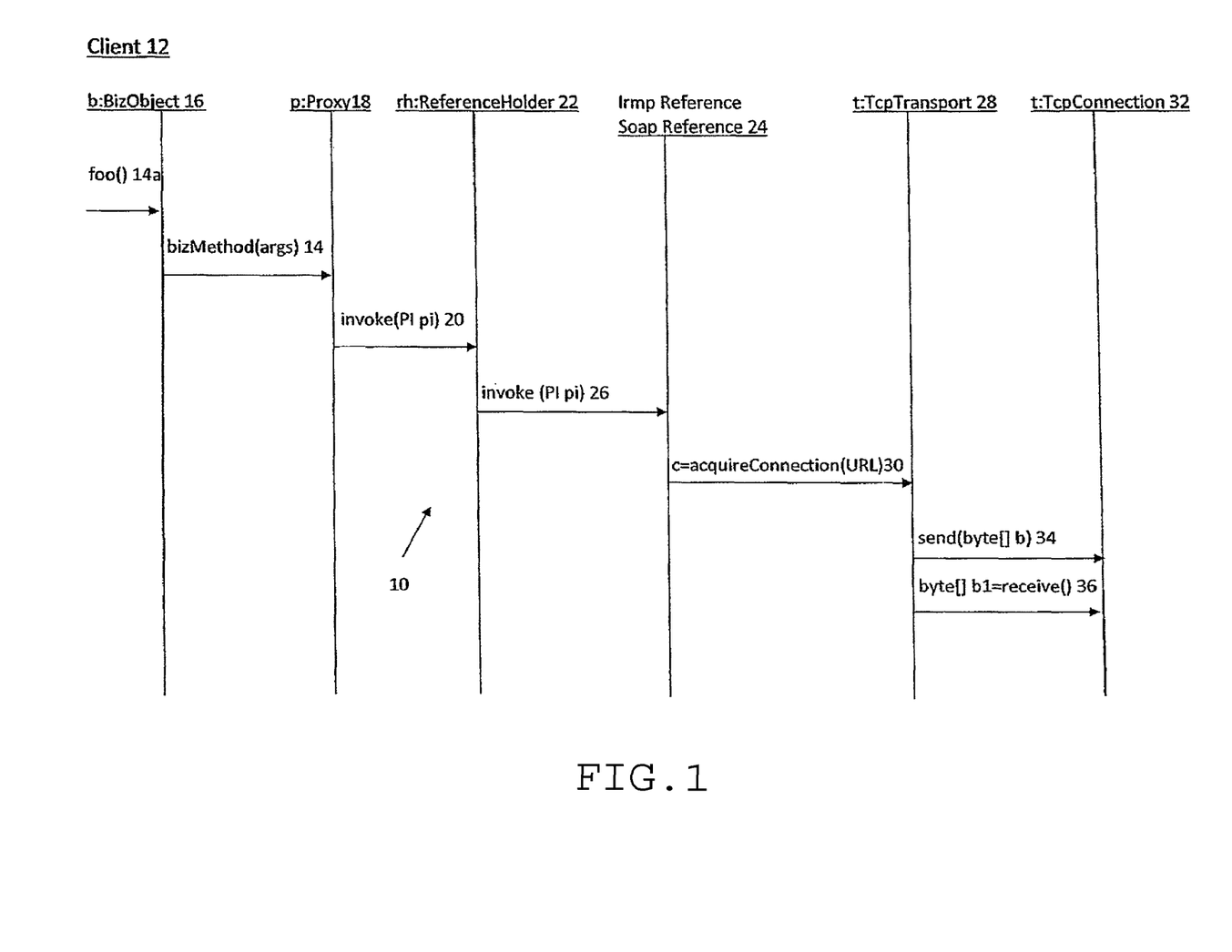
FIG. 1 depicts a flow diagram of a client performing a remote invocation in accordance with one or more embodiments.

FIG. 1 depicts a flow diagram 10 of a client 12 performing a remote invocation. A method 14a in a business object 16 is called on the client 12 and the business object 16 performs a remote invocation within the method 14a. A proxy method 14 is called on a proxy 18 passing various arguments. The proxy 18, which is generated by an architect console (not shown), calls a super class invoke method (not shown) which performs an invoke method 20 on a reference holder 22. The reference holder 22 is an object that contains information necessary to perform the remote invocation in terms of having the address of the object, being able to acquire a connection to it and sending the data to a server side (not shown) using that connection.

When a remote reference is acquired, either by performing a lookup (described further below) or as the result of the server returning a remote reference through another invocation, the reference information is encapsulated in data that is passed back to the client. The client then uses the information to create the address information, the reference holder and reference, and proxy, to be able to perform that invocation. Some embodiments include a two-layer design for the reference information in that multiple protocols are supported. The reference holder 22 contains the information that is necessary for performing any kind of remote invocation. Protocol specific references 24, such as IRMP reference, SOAP reference, the JAVA run time, and other, are further supported by one or more embodiments. These references 24 provide the mechanism to perform communication in the appropriate messaging protocol for that type of reference. For example, a SOAP reference takes an invocation consisting of the proxy 18 which is being invoke on, and the arguments. A connection 32 (such a TCP connection) to the server is acquired 30 (via a transport 28) based on the address of the proxy 18 that is being invoked on. The message is then sent 34 in the appropriate protocol via the connection 32 and a response 36 from the connection is received.

The appropriate protocol for a reference is decided upon when a lookup is performed or when a remote invocation returns a remote reference. During such instances, information is received, such as the address information, that is used to create a reference of the appropriate type. In the case of a lookup, part of the information that is passed includes the naming protocol to use. The naming protocol is associated with a messaging protocol.

If a server is returning a remote reference to the client as part of an invocation, and since the remote reference is going to be processed by a SOAP reference or an IRMP reference, for example, the server will already know this fact. In a naming service, when a lookup is performed, information is passed that is in a URL format. For example, in an irmp://host:port/name URL would be passed to perform in a lookup in the IRMP protocol. When a reference (IRMP or SOAP, for example) sends the invocation out across the network, it marshals the arguments in the appropriate protocol format (IRMP or SOAP), and sends any other necessary information to perform the invocation across the network to the server. Using the message streamer registered in the proxy initialization code, the argument types that are being passed can be ascertained and those streamers are able to marshal the argument of that type in the appropriate protocol As such, streamers for native primitive object types (such as integer and string for both IRMP and SOAP) exist and if custom types exist that will be passed back and forth, then streamers for those types would be present as well. When a response is received, any objects that were returned by the server are unmarshaled using the appropriate streamer.

The initialization code for the proxy consists of registering a type within the run time and registering method streamers for every method that the proxy exposes. The type is the unique string that uniquely identifies that type. This allows the distributed system of one or more embodiments to be cross-language and permits the mapping from a generic cross-language type to the appropriate language-specific type.

Figure 2:
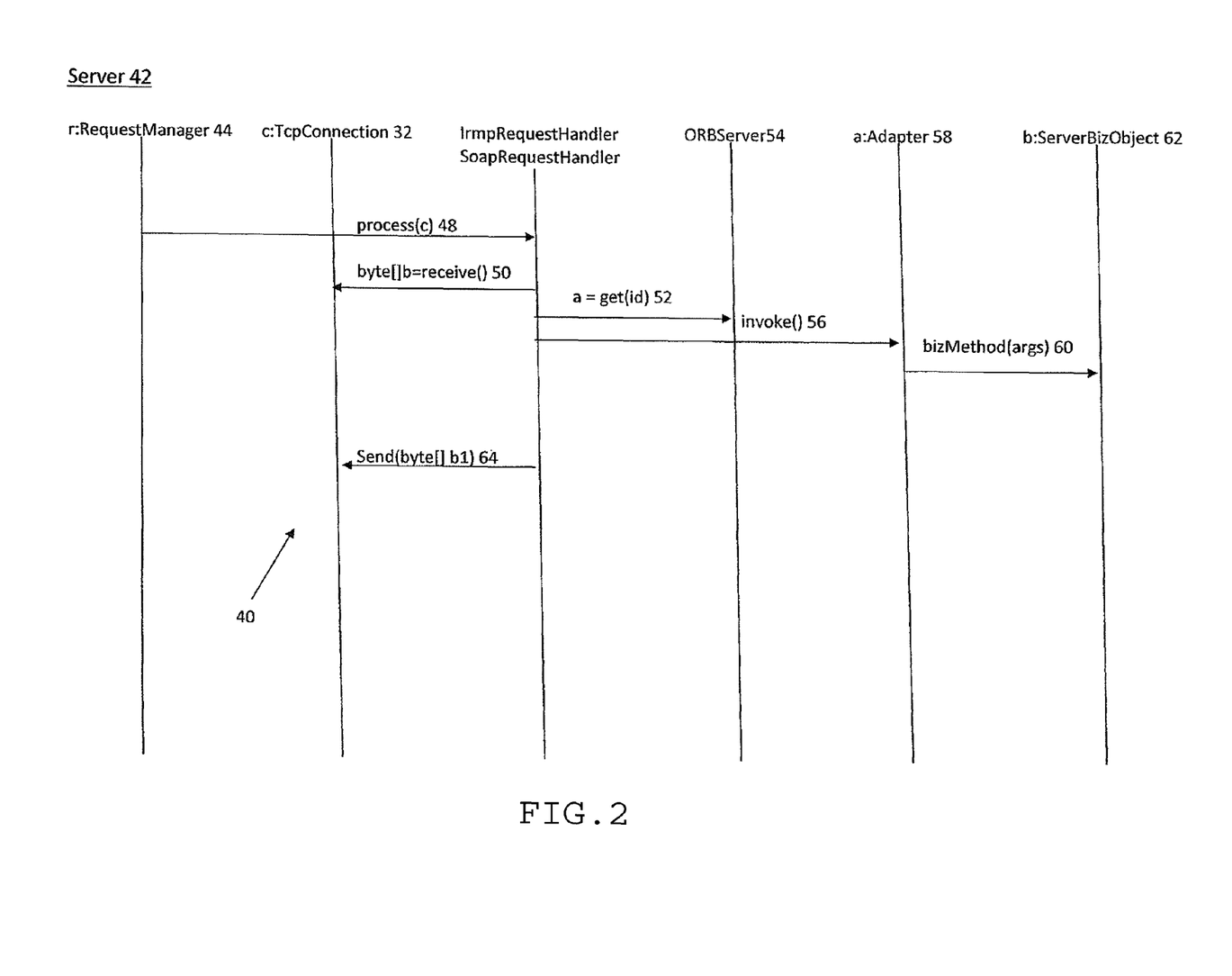
FIG. 2 depicts a flow diagram of a server responding to the client performing the remote invocation in accordance with one or more embodiments.

Referring now to FIG. 2, a flow diagram 40 of a server 42 responding to the client 12 performing the remote invocation is depicted. A request manager 44, which is associated with the connection 32, is adapted to receive incoming invocations via the connection. When the request manager 44 beings to receive an incoming invocation, it inquires as to the ability of each request handler 46 (which is protocol specific and is a counter-part to the client side protocol specific reference 24) to process 48 the incoming invocation. If a request handler 46 is able to process the invocation, the connection is handed off to the appropriate request handler 46. The request handler 46 received the incoming invocation from the connection 32 and reads the request off of the stream. In other words, the request handler 46 is reading the data off the socket and turning it into actual invocation data that is going to be processed. The request handler 46 uses streamers as the client 12 with an exception that where the client is streaming language-specific objects to protocol-specific data, the streaming occurs from protocol-specific to language-specific. In addition, the streamers may have been in a different language to the client side streamers, for example Java instead of C++. The invocation includes information such as the arguments and other information that is necessary to uniquely resolve the object that will be invoked and perform the invocation.

Once this information is received, an adapter 58 for that object is obtained from an ORB server 54 that maintains a mapping between an object ID and the adapter for that object. Based on the foregoing, the adapter that is going to be invoked is determined. The request handler 46 performs an invocation 56 which is received by the adapter 58 which is comprised of code generated from the architect console. The code, based on the operation that is being performed, calls a particular method 60 on the actual business object 62. At this point, the actual business method is called with the arguments and performs a particular operation such as, for example, transferring money from one account to another account. A response 64 is returned to the client 12 via the request handler 46 and the connection 32. The client decodes the response 64 concluding the remote invocation.

In one or more embodiments, a method for a first functionality (such as a client) in a programming language to perform operations within a second functionality (such as a server) in the programming language or in a different programming language comprises creating an adapter object for the second functionality, binding the adapter object within a naming service, looking-up a proxy object for the adapter object, and calling the second functionality through the proxy object by the first functionality. The second functionality can also be called through the adapter by the first functionality. The binding includes associating the adapter object to a URL within the naming service.

The adapter object further includes means to call the second functionality, wherein the second functionality is a business object, and wherein the business object consists of at least one operation. The means to call the second functionality includes at least one of: mapping a required name of the operation to the operation, and calling the operation with optional information to be passed to the operation, wherein the information includes arguments to the operation, and wherein the operation is a business method.

The adapter object and the second functionality are instances of classes, wherein the classes are in the same programming language. Further, the proxy object and the first functionality are instances of classes, wherein the classes are in the same programming language.

In a further embodiment, a computer readable medium comprise instructions for creating an adapter object for a second functionality, binding the adapter object within a naming service, wherein the binding associates the adapter object to a URL, looking-up a proxy object for the adapter object based on the URL, providing the proxy object to a first functionality, and calling the second functionality through the proxy object by the first functionality. The computer readable medium further comprises performing operations by the first functionality in a programming language within a second functionality in the programming language or in a different programming language.

The discussion will now center on how a lookup is performed via the client 12 to resolve the appropriate type of messaging protocol that will be used. Although not depicted, the client 12 can perform the lookup to obtain the proxy within the business object itself or elsewhere and then provide the proxy to the business object. When the proxy's lookup method passes in the URL format (consisting of an optional scheme-specific portion and a required scheme-specific portion), a client side naming service extracts the scheme, looks up a client side naming service using that scheme and then passes the lookup to that client type naming service. Effectively, a naming service interface exists which includes the aforementioned lookup method (as well as other methods) and implementations of the naming service (such as the IRMP naming service and the SOAP naming service, for example) which provide the implementation of that lookup using the messaging protocol associated with that naming service. For example, if an IRMP naming service is being used to perform a lookup, the IRMP naming service performs a remote invocation using the IRMP protocol to obtain the remote reference to that object.

This remote invocation is a static invocation whereby a name space class exists on a server as well as on the client. The name space class contains static methods for naming service operations including, lookup, bind, unbind, and rebind, as well as a registry of naming services. As such, when a lookup is performed, the name space class resolves the appropriate naming service and then hands off the lookup invocation to that naming service. The remote invocation is unique as it provides a simple, single point of entry for all naming service operations. In contrast, systems including an object request broker require a plurality of steps to be taken before naming service type operations can occur. One or more embodiments provide the static methods directly through the name space class. The use of static methods allows a lookup to be performed in as few steps as possible.

Once the server receives the lookup operation (utilizing the name space class), it extracts the scheme and then hands off the invocation to the IRMP naming service. The URL, which is local to this process and includes the scheme which is used by the name space to get the appropriate naming service, is received by a directory which returns the actual proxy back to the client via the previously described mechanism.

The naming service is a combination of a naming and directory service, which is capable of being federated across multiple processes. Using the IRMP naming service as an example, if a lookup is performed on the URL irmp://server/hotels/Dallas/Radisson, the portions of the URL include a scheme (irmp) as well as scheme specific portions including a host (server), a path (hotels/Dallas), and a name (Radisson). Once the host is reached, the rest of the URL is passed to the director which breaks the rest of the URL down into individual components. Let us assume that within the server (the primary server) a directory of hotels exists and that another server, which is running in Dallas, includes a directory called Dallas. When the server in Dallas is initiated, it starts up its directory and binds that directory into the primary server. Therefore, looking at the actual objects on the server, a directory with the name hotels exists with a directory proxy positioned beneath it with the name of Dallas. When the top level hotels directory receives a lookup, it is broken up with the rest of the URL passed off to the directory proxy. Since the Dallas directory is a proxy, it will perform a remote invocation to the server in Dallas which actually includes the Radisson name beneath it. Thus, the proxy is returned from the server to the client via the primary server.

A federated naming service is thus provided where a client only needs to know a URL or a host of the primary server. Service for every city can then be bound into either of those references transparently to the client. Basically, the business object is bound to the bind method which creates an adapter wrapping that business object and binds the adapter into the naming service. Similarly, the server that starts up in Dallas includes an indicator (via, for example, software) that is aware of the primary server. However, the code that binds the Radisson Hotel beneath Dallas only needs to be aware of the directory which it binds itself into regardless of where that directory is actually located. When the server performs a bind to an adapter (such as a bind to server/hotels/Dallas/Radisson), it needs to know the full path but it does not need to know that Dallas is actually being hosted on a server in Dallas.

In some embodiments, with respect to the lookup method, a method for creating a proxy object comprises calling a second functionality (such as a method in a proxy class), creating a proxy object by the second functionality, calling a third functionality (such as a method in a naming service registry class) by the second functionality, calling a fourth functionality (such as a method in a naming service implementation class) by the third functionality, creating a reference object by the fourth functionality, returning the reference object to the third functionality, associating the reference object to the proxy object by the third functionality, and returning the associated proxy object by the second functionality to a first functionality (such as an object of a class).

The method further includes by passing a URL to the second functionality, passing the proxy object and the URL to the third functionality, wherein the URL includes at least one of an optional scheme portion and a required scheme-specific portion, mapping the scheme portion to a naming service implementation, and passing the URL to the fourth functionality by the third functionality, wherein the naming service implementation contains the fourth functionality.

In some embodiments, with respect to the lookup method, a method for providing information related to a proxy object to a first functionality (such as a client) comprises receiving a lookup URL by a second functionality (such as a directory naming service or, for example, an IRMP Naming Service), calling a third functionality based on the lookup URL, and returning the information based on the called third functionality. The information, which includes an address of the object, wherein the address includes an URL and an object ID related to the proxy, is returned to the first functionality which utilizes the URL and the object ID to construct a proxy object.

The lookup URL is at least one of a local lookup URL and a remote lookup URL. The third functionality described above is a local directory if the lookup URL is local, wherein the lookup URL is local if there is a server socket running on the lookup URL that is local to the process. Conversely, the third functionality is a remote directory if the lookup URL is remote, wherein the lookup URL is remote if there is a sever socket running on the lookup URL that is remote to the process.

Calling the third functionality consists of utilizing the lookup URL to obtain the information, or, more specifically, splitting the lookup URL to obtain the information at a path level for the third functionality, wherein the third functionality includes a name related to the path. A directory splits the URL at a path level. Each directory name in the path (hotels/Dallas) is associated with a particular directory and the remainder of the URL is provided to each directory until the directory that is reached that has the actual entry in it. That directory then looks up the entry (Radisson). This occurs whether the URL is local or remote.

Although example embodiments of systems, methods, and computer readable media have been illustrated in the accompanied drawings and described in the foregoing detailed description, it will be understood that embodiments are not limited to those disclosed, but are capable of numerous rearrangements, modifications, and substitutions without departing from the spirit of the embodiments as set forth and defined by the following claims. For example, the capabilities of the client 12 and/or the server 42 can be performed by one or more modules in a distributed architecture and on or via any device able to transfer information between the client and the server. Further, the functionality performed by the elements within the client 12 and/or the server 42 may be performed by one or more of the elements such as the reference holder 22 or the request handler 46.

The invention claimed is:

1. A method comprising:
   utilizing a lookup address to access a directory, wherein the lookup address includes a scheme that is configured to be used by a name space to identify a naming service;
   retrieving, with a device, business object information from the directory, wherein the business object information includes a business object address and a business object identifier (ID); and
   communicating the business object information to enable construction of a proxy object that is configured to enable access to a business object and one or more invokable functionalities of the business object.

2. The method of claim 1, wherein utilizing the lookup address to access the directory comprises using one of a local lookup uniform resource locator (URL) or a remote lookup URL.

3. The method of claim 1, wherein utilizing the lookup address to access the directory comprises utilizing a scheme-specific portion of the lookup address to determine a messaging protocol.

4. The method of claim 1, wherein utilizing the lookup address to access the directory comprises determining a messaging protocol to be used in communicating the business object information.

5. The method of claim 1, wherein communicating the business object information comprises communicating the business object information from a first resource to a second resource that is remote from the first resource and that hosts the business object.

6. The method of claim 1, further comprising:
   receiving a request from a resource to invoke the one or more functionalities of the business object, wherein the request includes the business object ID and one or more arguments to be passed to the business object;
   causing one or more of the functionalities of the business object to be performed using the one or more arguments; and
   communicating a response for receipt by the resource based on the performing of the one or more functionalities by the business object.

7. A tangible computer-readable medium having instructions stored thereon, the instructions comprising:
   instructions to utilize a lookup address to access a directory, wherein the lookup address includes a scheme that is configured to be used by a name space to identify a naming service;
   instructions to retrieve business object information from the directory, wherein the business object information includes a business object address and a business object identifier (ID); and
   instructions to communicate the business object information to enable construction of a proxy object that is configured to enable access to a business object and one or more invokable functionalities of the business object.

8. The tangible computer-readable medium of claim 7, wherein the instructions to utilize the lookup address to access the directory are configured to use one of a local lookup uniform resource locator (URL) or a remote lookup URL.

9. The tangible computer-readable medium of claim 7, wherein the instructions to utilize the lookup address to access the directory are configured to use a scheme-specific portion of the lookup address to determine a messaging protocol.

10. The tangible computer-readable medium of claim 7, wherein the instructions to utilize the lookup address to access the directory are configured to determine a messaging protocol to be used in communicating the business object information.

11. The tangible computer-readable medium of claim 7, wherein the instructions to communicate the business object information are configured to communicate the business object information from a first resource to a second resource that is remote from the first resource and that hosts the business object.

12. The tangible computer-readable medium of claim 7, further comprising:
   instructions to receive a request from a resource to invoke the one or more functionalities of the business object, wherein the request includes the business object ID and one or more arguments to be passed to the business object;
   instructions to cause one or more of the functionalities of the business object to be performed using the one or more arguments; and
   instructions to communicate a response for receipt by the resource based on the performing of the one or more functionalities by the business object.

* * * * *

UNITED STATES PATENT AND TRADEMARK OFFICE
CERTIFICATE OF CORRECTION

PATENT NO. : 8,307,380 B2
APPLICATION NO. : 12/787957
DATED : November 6, 2012
INVENTOR(S) : Wheeler It is certified that error appears in the above-identified patent and that said Letters Patent is hereby corrected as shown below:

On the Title Page, item (75), under "Inventor", in Column 1, Line 1,
delete "T" and insert -- T. --, therefor.

On Page 4, item (56), under "OTHER PUBLICATIONS", in Column 1,
Line 17, delete "2000.," and insert -- 2000, --, therefor.

On Page 4, item (56), under "OTHER PUBLICATIONS", in Column 1,
Line 24, delete "2002.," and insert -- 2002, --, therefor.

On Page 4, item (56), under "OTHER PUBLICATIONS", in Column 1, Line 30, delete
"Heterogenous" and insert -- Heterogeneous --, therefor.

On Page 4, item (56), under "OTHER PUBLICATIONS", in Column 1,
Line 49, delete "1,," and insert -- 1, --, therefor.

On Page 4, item (56), under "OTHER PUBLICATIONS", in Column 2,
Line 6, delete "Proceedings. ITRE2003.," and insert -- Proceedings, ITRE 2003, --, therefor.

On Page 4, item (56), under "OTHER PUBLICATIONS", in Column 2,
Line 11, delete "Philosophy.," and insert -- Philosophy, --, therefor.

On Page 4, item (56), under "OTHER PUBLICATIONS", in Column 2,
Line 25, delete "143-150.," and insert -- 143-150, --, therefor.

On Page 4, item (56), under "OTHER PUBLICATIONS", in Column 2,
Line 62, delete "8059.," and insert -- 8059, --, therefor.

On Page 4, item (56), under "OTHER PUBLICATIONS", in Column 2,
Line 69, delete "524-534.," and insert -- 524-534, --, therefor.

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,307,380 B2

On Page 5, item (56), under "OTHER PUBLICATIONS", in Column 2, Line 2, delete "Retreived" and insert -- Retrieved --, therefor.

In Column 7, Line 15, delete "sever" and insert -- server --, therefor.